United States Patent
Suzuki

(10) Patent No.: US 9,403,391 B2
(45) Date of Patent: Aug. 2, 2016

(54) LIQUID-DROPLET EJECTING APPARATUS, METHOD FOR CONTROLLING THE SAME, AND NONVOLATILE STORAGE MEDIUM STORING PROGRAM FOR CONTROLLING THE APPARATUS

(75) Inventor: Katsuaki Suzuki, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/363,261

(22) Filed: Jan. 31, 2012

(65) Prior Publication Data

US 2012/0194590 A1    Aug. 2, 2012

(30) Foreign Application Priority Data

Jan. 31, 2011    (JP) .................................. 2011-018736

(51) Int. Cl.
  *B41J 29/38*    (2006.01)
(52) U.S. Cl.
  CPC ...................................... *B41J 29/38* (2013.01)
(58) Field of Classification Search
  CPC ..................................................... B41J 29/38
  USPC .......................................................... 347/14
  See application file for complete search history.

(56) References Cited

U.S. PATENT DOCUMENTS 5,111,302 A * 5/1992 Chan et al. ..................... 358/534
6,213,579 B1 * 4/2001 Cornell et al. .................. 347/14
2009/0147039 A1   6/2009 Koase
2009/0244634 A1 * 10/2009 Hasegawa et al. ........... 358/3.23
2012/0162300 A1   6/2012 Hirata et al.

FOREIGN PATENT DOCUMENTS

| JP | 2002-067357 A | 3/2002 |
|----|---|---|
| JP | 2007-307763 A | 11/2007 |
| JP | 2009-143010 A | 7/2009 |
| JP | 2009-143011 A | 7/2009 |
| JP | 2009-143012 A | 7/2009 |
| JP | 2009-143013 A | 7/2009 |
| JP | 2010-253726 A | 11/2010 |

OTHER PUBLICATIONS

Japan Patent Office, Notification of Reason for Refusal for Japanese Patent Application No. 2011-018736 (counterpart Japanese patent application), mailed Feb. 26, 2013.

* cited by examiner

*Primary Examiner* — Manish S Shah
*Assistant Examiner* — Jeffrey C Morgan
(74) *Attorney, Agent, or Firm* — Baker Botts L.L.P.

(57) ABSTRACT

A liquid-droplet ejecting apparatus including: a head configured to eject liquid onto a recording medium; a curl-amount calculating section configured to calculate a curl amount of the recording medium on the basis of a location of at least one evaluation region on the recording medium and calculated amount of the liquid and the calculated number of liquid droplets to be ejected for the at least one evaluation region; and a curl suppressing section configured to change the evaluation ejection data for the at least one evaluation region on the basis of the calculated curl amount of the recording medium so as to change the amount of the liquid and/or the number of the liquid droplets to be ejected onto at least the at least one evaluation region on the recording medium to suppress the curl of the recording medium.

12 Claims, 9 Drawing Sheets

FIG.3A Black

|   | a | b | c | d | e | f |
|---|---|---|---|---|---|---|
| 1 |   |   | M | M | M |   |
| 2 |   |   | M |   |   |   |
| 3 |   | L | M |   |   |   |
| 4 |   |   |   |   |   |   |
| 5 |   |   |   |   |   |   |
| 6 |   |   |   |   |   |   |

FIG.3B Cyan

|   | a | b | c | d | e | f |
|---|---|---|---|---|---|---|
| 1 |   |   |   |   |   |   |
| 2 |   |   |   |   |   |   |
| 3 |   |   |   |   |   |   |
| 4 |   |   |   | M |   |   |
| 5 |   |   | L | M |   |   |
| 6 |   |   |   |   |   |   |

FIG.3C Magenta

|   | a | b | c | d | e | f |
|---|---|---|---|---|---|---|
| 1 |   |   |   |   |   |   |
| 2 |   |   |   |   |   |   |
| 3 |   |   |   |   |   |   |
| 4 |   |   |   |   | S |   |
| 5 |   |   |   | L | M |   |
| 6 |   | M | S | M |   |   |

FIG.3D Yellow

|   | a | b | c | d | e | f |
|---|---|---|---|---|---|---|
| 1 |   |   |   |   |   |   |
| 2 |   |   |   | S | S |   |
| 3 |   |   |   | S | S |   |
| 4 |   |   | S | S | S |   |
| 5 |   | L | M | S | M |   |
| 6 |   |   |   |   |   |   |

↑ 99 CONVEYANCE DIRECTION

LIQUID-DROPLET EJECTING APPARATUS, METHOD FOR CONTROLLING THE SAME, AND NONVOLATILE STORAGE MEDIUM STORING PROGRAM FOR CONTROLLING THE APPARATUS

CROSS REFERENCE TO RELATED APPLICATION

The present application claims priority from Japanese Patent Application No. 2011-018736, which was filed on Jan. 31, 2011, the disclosure of which is herein incorporated by reference in its entirety.

BACKGROUND OF THE INVENTION

1. Field of the Invention

The present invention relates to a liquid-droplet ejecting apparatus configured to eject droplets of liquid such as ink to form an image on a recording medium, a method for controlling the apparatus, and a nonvolatile storage medium storing a program for controlling the apparatus, and more particularly to a technique for suppressing a curl of the recording medium on which the liquid is attached.

2. Description of the Related Art

As one example of a liquid-droplet ejecting apparatus, there is known an ink jet printer configured to eject ink onto a recording medium such as a paper sheet, a cloth, and a film to record or form an image thereon. Water-based ink containing water (water content) as a solvent may be used in the ink jet printer. In this case, the water contained in the ink may cause a curl of the recording medium on which the ink has been attached, after the image recording. A state and an amount of the curl vary depending upon a state of the ink laying on the recording medium. In general, the curl is easily produced in a case where a difference of an amount of water becomes relatively large between a front side and a back side of the recording medium by the ink attached on the recording medium. When the curl has been produced on the recording medium, the discharged recording media may not be stacked orderly, and the recording medium may be bent and/or scattered. In order to solve these problems, it is preferable to estimate the curl of the recording medium accurately and suppress the curl appropriately. Thus, there is proposed a method for calculating, for each area defined on the recording medium, an amount of the liquid to be ejected by a liquid-droplet ejecting apparatus onto the area, and for estimating a state of the curl of the recording medium on the basis of a position of the area and the amount of the liquid to be ejected on the area.

SUMMARY OF THE INVENTION

Even where the same amount of the ink is ejected on the recording medium, a manner in which the curl is produced on the recording medium is different between a case where the ink is ejected on an entire recording medium and a case where the ink is ejected on a part of the recording medium. Thus, in the above-described proposal, a certain area is set on the recording medium, and the state of the curl of the recording medium is estimated on the basis of a position of the certain area on the recording medium and an amount of the liquid to be ejected on the certain area. However, the inventor of the present invention has newly found that, where a certain area is set on the recording medium, the amount of the curl of the recording medium is affected by the number of the liquid droplets to be ejected on the certain area in addition to a position of the certain area on the recording medium and an amount of the liquid to be ejected on the certain area. Further, the inventor has found that the number of the liquid droplets to be ejected onto the certain area has a considerably great effect on the amount of the curl of the recording medium. A cause of this is presumed that the number of liquid droplets and an amount of the liquid per unit area on the recording medium do not always correspond to each other in a liquid-droplet ejecting apparatus configured to produce or perform a tone (gradation) representation on the basis of a size of the liquid droplet. Accordingly, the method in the above-described proposal does not always estimate the amount of the curl of the recording medium accurately. If the estimate amount of the curl of the recording medium is not accurate, when the curl is corrected on the basis of this estimated amount, the correction may be not enough, and a greater length of time and/or a greater amount of energy than necessary may be required for the correction.

This invention has been developed in view of the above-described situations, and it is an object of the present invention to provide: a liquid-droplet ejecting apparatus configured to accurately and speedily estimate an amount of a curl of a recording medium on which an image is formed, on the basis of the above-described findings, and to prevent the curl while suppressing a lowering of a throughput of recording on the basis of the estimated amount of the curl; a method for controlling the apparatus; and a nonvolatile storage medium storing a program for controlling the apparatus.

The object indicated above may be achieved according to the present invention which provides a liquid-droplet ejecting apparatus including: at least one liquid-droplet ejection head configured to eject liquid onto a recording medium; a liquid-droplet-ejection-data storage section configured to store liquid-droplet ejection data based on which the at least one liquid-droplet ejection head ejects a plurality of liquid droplets to form an image on the recording medium; a liquid-droplet-ejection-head controlling section configured to control the at least one liquid-droplet ejection head on the basis of the liquid-droplet ejection data; a liquid calculating section configured to calculate an amount of the liquid and the number of liquid droplets to be ejected for each of at least one evaluation region that is defined on the recording medium, the liquid calculating section being configured to calculate the amount of the liquid and the number of the liquid droplets on the basis of evaluation ejection data as liquid-droplet ejection data corresponding to the at least one evaluation region among the liquid-droplet ejection data; a curl-amount calculating section configured to calculate an amount of a curl of the recording medium on the basis of a location of the at least one evaluation region and the amount of the liquid and the number of the liquid droplets to be ejected for the at least one evaluation region which have been calculated by the liquid calculating section, the curl being produced by the ejection of the liquid droplets on the recording medium; and a curl suppressing section configured to change the evaluation ejection data on the basis of the amount of the curl of the recording medium calculated by the curl-amount calculating section when a processing for suppressing the curl of the recording medium is required, the curl suppressing section being configured to change the evaluation ejection data so as to change at least one of the amount of the liquid and the number of the liquid droplets to be ejected onto at least the at least one evaluation region on the recording medium to suppress the curl of the recording medium.

The object indicated above may also be achieved according to the present invention which provides a method for controlling a liquid-droplet ejecting apparatus, the apparatus comprising: at least one liquid-droplet ejection head configured to eject liquid onto a recording medium; and a liquid-droplet-ejection-data storage section configured to store liquid-droplet ejection data based on which the at least one liquid-droplet ejection head ejects a plurality of liquid droplets to form an image on the recording medium, the method comprising: on the basis of evaluation ejection data as liquid-droplet ejection data corresponding to at least one evaluation region defined on the recording medium among the liquid-droplet ejection data, calculating an amount of the liquid and the number of liquid droplets to be ejected for each of the at least one evaluation region; calculating an amount of a curl of the recording medium on the basis of a location of the at least one evaluation region and the calculated amount of the liquid and the calculated number of the liquid droplets to be ejected for each of the at least one evaluation region, the curl being produced by the ejection of the liquid droplets on the recording medium; changing the evaluation ejection data on the basis of the calculated amount of the curl of the recording medium when a processing for suppressing the curl of the recording medium is required, so as to change at least one of the amount of the liquid and the number of the liquid droplets to be ejected onto at least the at least one evaluation region on the recording medium to suppress the curl of the recording medium; and controlling the at least one liquid-droplet ejection head on the basis of the changed evaluation ejection data.

The object indicated above may also be achieved according to the present invention which provides a nonvolatile storage medium storing a program for controlling a liquid-droplet ejecting apparatus, the apparatus comprising: at least one liquid-droplet ejection head configured to eject liquid onto a recording medium; and a liquid-droplet-ejection-data storage section configured to store liquid-droplet ejection data based on which the at least one liquid-droplet ejection head ejects a plurality of liquid droplets to form an image on the recording medium, the program being designed to comprise: on the basis of evaluation ejection data as liquid-droplet ejection data corresponding to at least one evaluation region defined on the recording medium among the liquid-droplet ejection data, calculating an amount of the liquid and the number of liquid droplets to be ejected for each of at least one evaluation region; calculating an amount of a curl of the recording medium on the basis of a location of the at least one evaluation region and the calculated amount of the liquid and the calculated number of the liquid droplets to be ejected for each of the at least one evaluation region, the curl being produced by the ejection of the liquid droplets on the recording medium; and changing the evaluation ejection data on the basis of the calculated amount of the curl of the recording medium when a processing for suppressing the curl of the recording medium is required, so as to change at least one of the amount of the liquid and the number of the liquid droplets to be ejected onto at least the at least one evaluation region on the recording medium to suppress the curl of the recording medium.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIGS. 3A-3D are views showing ink ejection data of a certain area, wherein FIG. 3A shows black ink ejection data, FIG. 3B shows cyan ink ejection data, FIG. 3C shows magenta ink ejection data, and FIG. 3D shows yellow ink ejection data;

DETAILED DESCRIPTION OF THE EMBODIMENT

Hereinafter, there will be described an ink jet printer as one example of a liquid-droplet ejecting apparatus to which the present invention is applied, by reference to the drawings.

Figure 1:
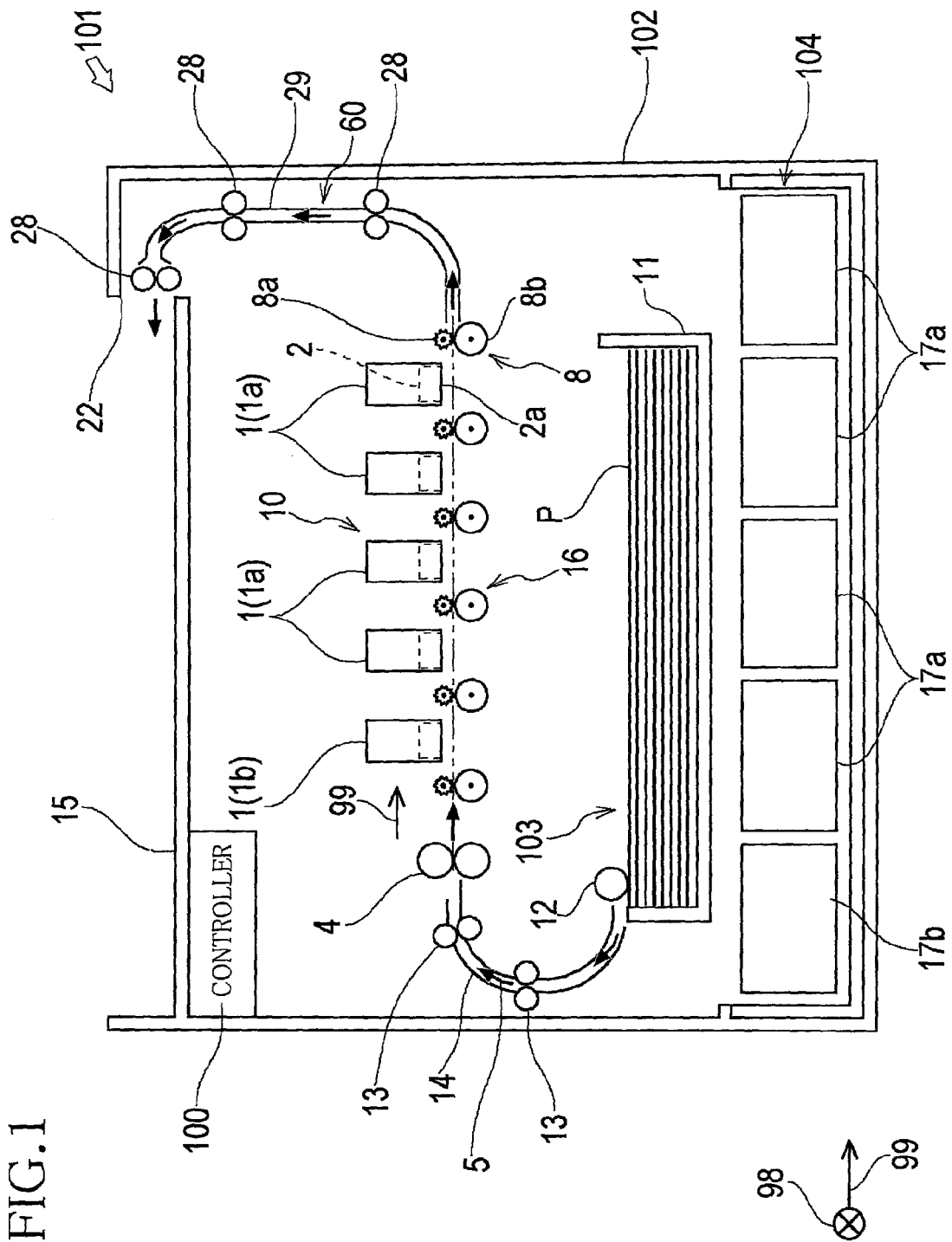
FIG. 1 is a side view generally showing an overall construction of an ink jet printer as one embodiment to which the present invention is applied.

As shown in FIG. 1, an ink jet printer 101 as the present embodiment includes a casing 102 having a generally rectangular parallelepiped shape. A head unit 10, a conveyance unit 16, a sheet-supply unit 103, and a tank unit 104 are provided in the casing 102 so as to be arranged in order in a downward direction. The head unit 10 is constituted by five heads 1. The conveyance unit 16 is configured to convey a recording medium in the form of a sheet P in a conveyance direction 99 in which the sheet P is conveyed under the heads 1 (that is, the conveyance direction 99 is a rightward direction in FIG. 1). The sheet-supply unit 103 supplies the sheet P, and the tank unit 104 stores liquid such as ink. A controller 100 for controlling operations of the units is provided at a position not interfering with the units in the casing 102. An upper face of the casing 102 functions as a sheet-discharge portion 15 onto which the sheet P is discharged after recording.

Four of the five heads 1 of the head unit 10 are recording heads 1a for ejecting inks each as one example of a liquid-droplet ejection head. In the present embodiment, the four recording heads 1a are configured to respectively eject black, cyan, magenta, and yellow inks. The other one head 1 is a treatment-liquid head 1b for ejecting treatment liquid. Here, treatment liquid for coagulating pigments is used for pigment ink, and treatment liquid for precipitating dyes is used for dyeing ink. Main materials of the treatment liquid is selectively employed in accordance with an property of the ink from among liquid and the like containing a cationic compound (such as a cationic high polymer and a cationic surface active agent) and/or polyvalent metal salt such as calcium salt and magnesium salt. When the ink is landed on an area on the sheet P which is coated with such treatment liquid, components of the treatment liquid such as the polyvalent metal salt react with components of the ink (i.e., the dyes or pigments as a coloring agent) to coagulate or precipitate an insoluble or hardly soluble metal complex, and the like. As a result, the landed ink less penetrates into the sheet P, causing the ink to easily remain on an area on the sheet P near a sheet surface.

The treatment-liquid head 1b is disposed at a most-upstream position in the conveyance direction 99 among the five heads 1. On a downstream side of the treatment-liquid head 1b in the conveyance direction 99, the four recording heads 1a are arranged in ascending order of brightness of the inks to be ejected therefrom, that is, the black head 1a, the cyan head 1a, the magenta head 1a, and the yellow head 1a are arranged in order from an upstream side thereof toward a downstream side thereof.

The five heads 1 have generally the same construction, and each head 1 is a line head having a generally rectangular parallelepiped shape elongated in a recording widthwise direction 98. Here, the recording widthwise direction 98 is a direction parallel to a horizontal plane and perpendicular to the conveyance direction 99. Each head 1 includes a head main body 2 having an ejection face 2a in which a multiplicity of ejection openings, not shown, are open. When the sheet P is conveyed by the conveyance unit 16 in the conveyance direction 99, the ejection face 2a is vertically opposed to the sheet P with a predetermined distance therebetween. Each of the head main body 2 includes a multiplicity of actuators, not shown, controlled by a head controlling section 51 which will be described below. Each of the actuators applies an ejection energy to the treatment liquid or the ink to eject the treatment liquid or the ink from a corresponding one of the ejection openings. It is noted that this printer 101 has a resolution of 600 dpi in the recording widthwise direction 98 (i.e., a main scanning direction) and in the conveyance direction 99 (i.e., a sub-scanning direction). That is, a face of the sheet P is virtually divided into a plurality of unit areas (dot areas) in a grid pattern, each having a square shape having a length of 1/600 inch in the recording widthwise direction 98 and in the conveyance direction 99.

The tank unit 104 includes four ink tanks 17a and one treatment-liquid tank 17b. The ink tanks 17a and the treatment-liquid tank 17b are mounted on the casing 102 so as to be removable therefrom. The ink tanks 17a respectively store therein the black ink, the cyan ink, the magenta ink, and the yellow ink. The inks are respectively supplied from the ink tanks 17a to the recording heads 1a through tubes, not shown. Likewise, the treatment-liquid tank 17b stores the treatment liquid therein, and the treatment liquid is supplied from the treatment-liquid tank 17b to the treatment-liquid head 1b through a tube, not shown.

The sheet-supply unit 103 includes a sheet-supply roller 12 and a sheet-supply tray 11 that is mountable on and removable from the casing 102. The sheet-supply tray 11 has a box shape opening upward and accommodates a plurality of the sheets P stacked on one another. The sheet-supply roller 12 is held in contact with an uppermost one of the sheets P accommodated in the sheet-supply tray 11. The sheet-supply roller 12 is rotatable by a drive power generated by a sheet-supply motor 31 (see FIG. 2) that is controlled by the controller 100. When the sheet-supply roller 12 is rotated by the sheet-supply motor 31, the uppermost sheet P in the sheet-supply tray 11 is supplied into a sheet conveyance path 5 which will be described below.

As indicated by black arrows in FIG. 1, in the casing 102 is formed the conveyance path 5 extending from the sheet-supply tray 11 to the sheet-discharge portion 15. The conveyance path 5 is defined by a plurality of sheet-supply guides 14, the conveyance unit 16, a plurality of sheet-discharge guides 29 so as to have an S shape inverted in a rightward and leftward direction as a whole. The sheet P supplied from the sheet-supply tray 11 by the sheet-supply roller 12 is conveyed by a plurality conveyance roller pairs 13 to the conveyance unit 16 while guided by the sheet-supply guides 14. A registration roller pair 4 is provided on an upstream side of the conveyance unit 16 in the conveyance direction 99. The registration roller pair 4 adjusts a posture of the sheet P and conveys the sheet P to the conveyance unit 16. The conveyance unit 16 conveys the sheet P in the conveyance direction 99 through positions at which the image is recorded (just under the heads 1). Specifically, the conveyance unit 16 conveys the sheet P at a predetermined speed during the image recording. When the sheet P is conveyed through the positions just under the heads 1, the treatment liquid and the inks are ejected onto the sheet P to form a desired color image on a recording face or an upper face of the sheet P. The sheet P on which the image has been recorded is conveyed toward a downstream side of the conveyance unit 16 along the conveyance path 5. The sheet P is then conveyed upward by a plurality of sheet-discharge roller pairs 28 through a sheet-discharge path 60 defined by the sheet-discharge guides 29. The sheet P is then discharged onto the sheet-discharge portion 15 through a sheet-discharge opening 22 formed in an upper portion of the casing 102.

The conveyance unit 16 includes a plurality of conveyance roller pairs 8 arranged in the conveyance direction 99. The conveyance roller pairs 8 are respectively arranged on a downstream side and an upstream side of the heads 1 in the conveyance direction 99 and at positions each interposed between corresponding adjacent two of the heads 1. Each of the conveyance roller pairs 8 is constituted by a conveyance roller 8b and a toothed roller 8a arranged in the vertical direction. The conveyance roller 8b is disposed such that an outer circumferential face thereof contacts a lower face of the sheet P. The toothed roller 8a is disposed so as to be opposed to the outer circumferential face of the conveyance roller 8b with the conveyed sheet P interposed therebetween. The toothed roller 8a includes a support shaft extending in the recording widthwise direction 98 and a plurality of toothed discs projecting from the support shaft and spaced from one another in a circumferential direction of the shaft. Each of the toothed discs is a thin plate having teeth on an outer circumferential face thereof, and distal ends of these teeth contact the sheet P. Each of the toothed rollers 8a is urged toward a corresponding one of the conveyance rollers 8b by an urging means, not shown, such that the outer circumferential face of the toothed roller 8a is held in pressing contact with the outer circumferential face of the conveyance roller 8b. When the conveyance rollers 8b of the conveyance unit 16 are rotated by a conveyance motor 33 (see FIG. 2), the sheet P is nipped between the toothed roller 8a and the conveyance roller 8b and conveyed thereby toward a downstream side thereof in the conveyance direction 99.

Figure 2:
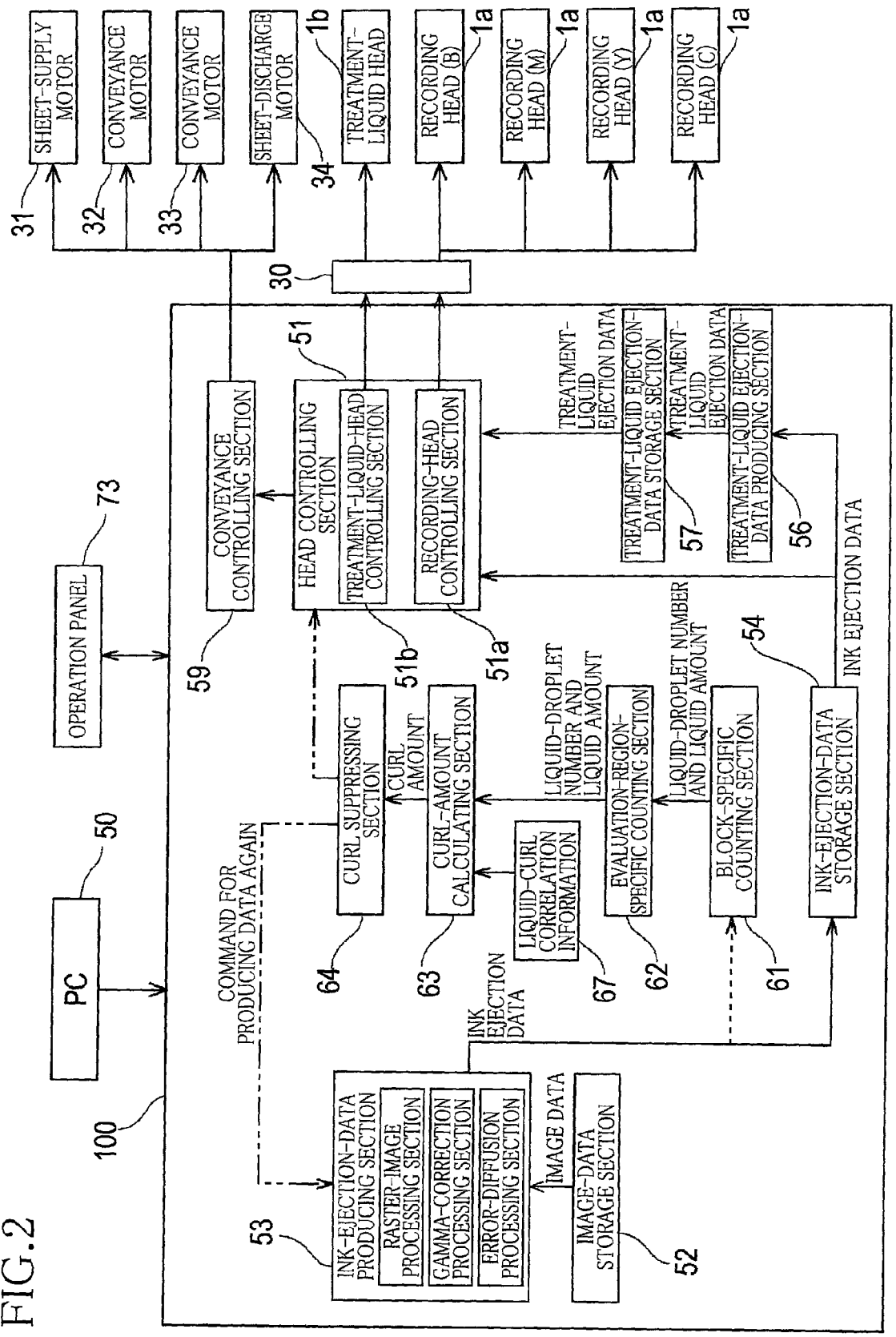
FIG. 2 is a functional block diagram of a controller.

There will be next explained an electric configuration of the printer 101 with reference to FIG. 2. In FIG. 2, arrows indicate flows of data. The controller 100 of the printer 101 is constituted by one or more computers, and although not shown, each computer includes (a) a central processing unit (CPU), (b) a main storage for rewritably storing: programs to be executed by the CPU; and data used for the programs, (c) a backing storage for temporarily storing the data in the execution of the programs by the CPU, (d) an interface for connecting between the CPU and an external device, (e) internal paths for connecting these components, and so on. The programs to be executed by the CPU are stored in advance in various storage media such as a flexible disc, a CD-ROM, and a memory card and installed into the main storage via one of these storage media. When the programs are executed by the CPU, various functional sections of the controller 100 shown in FIG. 2 are operated. The CPU of the controller 100 is connected to an operation panel 73 as an input and output device via the interface. When a user has performed an input operation using the operation panel 73, a signal indicating the input operation is inputted to the CPU, based on which the CPU controls the operations of the components of the printer 101. During the operation of the printer 101, various information for the user is displayed in a text or symbol form on a display screen of the operation panel 73. The CPU of the controller 100 is connected to an external computer 50 via the interface for data transmission therebetween. The controller 100 of the printer 101 controls the operation of the components of the printer 101 on the basis of the image data, the input signals, and so on transmitted from the external computer 50.

The controller 100 includes an image-data storage section 52 and an ink-ejection-data producing section 53 (as one example of a liquid-droplet-ejection-data producing section) as the functional sections. The image-data storage section 52 stores the image data based on which the image is recorded on the sheet P. The image data is transmitted to the controller 100 from the external computer 50 connected to the printer 101, a printer driver, or the like. The ink-ejection-data producing section 53 is configured to produce ink ejection data on the basis of the image data stored in the image-data storage section 52. The ink-ejection-data producing section 53 includes a raster-image processing section, a gamma-correction processing section, and an error-diffusion processing section. The image data stored in the image-data storage section 52 is vector image data, and the ink-ejection-data producing section 53 executes a raster image processing for the image data to produce the ink ejection data. The ink ejection data is raster image data that shows a size of a dot (dot size) formed in each unit area (dot area) virtually defined on the sheet P. The dot size in the ink ejection data is a size of a liquid droplet (ink droplet) to be ejected by any one of the recording heads 1a onto the unit area(s) on the sheet P and is represented by one of four levels or sizes, namely, zero, a small droplet, a medium-size droplet, and a large droplet. In other words, the size of the liquid droplet shows an amount of the ink (an amount of the liquid droplet) to be ejected onto the unit area on the sheet P. It is noted that, where the size of the liquid droplet to be ejected onto the unit area on the sheet P is changed, a single liquid droplet having a desired size may be ejected, and a plurality of micro-liquid droplets having the same size as one another may be ejected such that a total amount of the micro-liquid droplets corresponds to the desired size (amount), for example. In the latter case, a plural number of the liquid droplets are ejected in the ejection of the micro-liquid droplets, but the number of the liquid droplets is counted as one assuming that the micro-liquid droplets are one droplet. The gamma correction processing and the error diffusion processing are performed for the thus produced ink ejection data as needed. In the present embodiment, the ink ejection data is converted from 8 bit to 2 bit by the error diffusion processing.

As shown in FIGS. 3A-3D, an ink-ejection-data storage section 54 (as one example of a liquid-droplet-ejection-data storage section) of the controller 100 stores therein four sets of the ink ejection data respectively for the four recording heads 1a, for example. It is noted that the four ink ejection data sets shown in FIG. 3 corresponds to an image to be recorded on a specific area on the sheet P (the specific area contains thirty-six unit areas in six lines 1-6 and six rows a-f). Further, each of "S", "M", and "L" in FIGS. 3A-3D represents a size of a dot to be formed on the unit area virtually defined on the sheet P, and each unit area having none of "S", "M", and "L" represents a unit area on which the dot is not to be formed, that is, the ink is not to be ejected. It is noted that the dot sizes S, M, L respectively correspond to the small droplet, the medium-size droplet, and the large droplet ejected by the recording heads a.

The controller 100 includes the ink-ejection-data storage section 54, a block-specific counting section 61, an evaluation-region-specific counting section 62 as one example of a liquid calculating section, a curl-amount calculating section 63, and a curl suppressing section 64. These functional sections execute a processing for suppressing or restraining a curl of the sheet P. There will be next explained these functional sections with reference to FIGS. 2 and 4.

The ink-ejection-data storage section 54 can store the ink ejection data corresponding to at least a single page. The ink ejection data produced by the ink-ejection-data producing section 53 is transmitted from the ink-ejection-data producing section 53 to the ink-ejection-data storage section 54. Here, the ink-ejection-data producing section 53 and the ink-ejection-data storage section 54 are wiredly connected to each other, and the ink ejection data containing data of at least one unit area (dot area) is transmitted per clock under a data transfer standard for a short distance. Thus, the transmission of the ink ejection data of one page from the ink-ejection-data producing section 53 to the ink-ejection-data storage section 54 requires a length of time determined upon the number of pixels.

Figure 4:
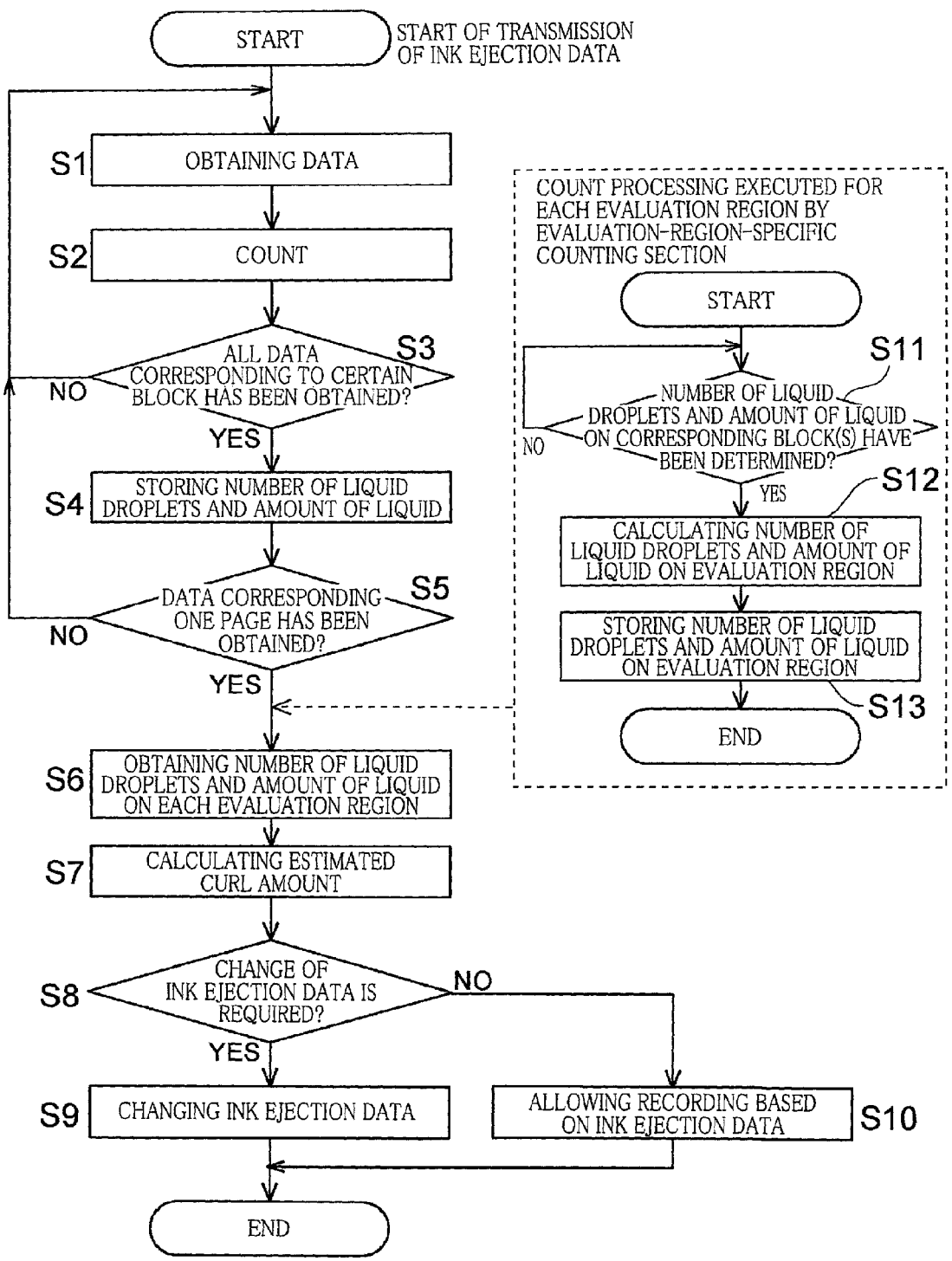
FIG. 4 is a flow-chart showing a processing for suppressing a curl.

In S1 in FIG. 4, the block-specific counting section 61 obtains the ink ejection data in a process in which the ink ejection data is transmitted from the ink-ejection-data producing section 53 to the ink-ejection-data storage section 54. Then in S2, the block-specific counting section 61 counts or obtains one by one the numbers of the liquid droplets and the amounts of the liquid on blocks which will be described below, each time when the block-specific counting section 61 has obtained the ink ejection data.

Figure 5:
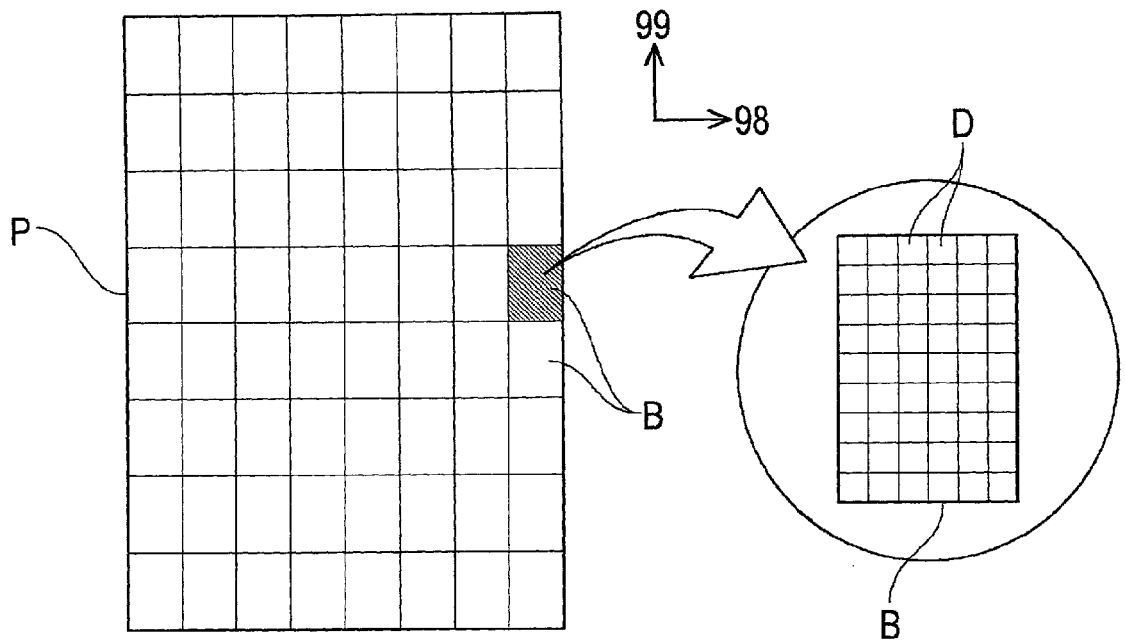
FIG. 5 is a view showing a relationship between blocks and unit areas defined on a sheet.

FIG. 5 is a view showing a relationship between blocks B and unit areas D defined on the sheet P. As shown in FIG. 5, each of one sheet P (the single sheet P) and the ink ejection data corresponding thereto is divided into predetermined middle-size areas (each may be hereinafter called the block B). For example, where one sheet P is divided into eight lines in the conveyance direction 99 and eight rows in the recording widthwise direction 98, the sheet P is divided into sixty-four blocks B. Each of the blocks B is an area constituted by a plurality of the unit areas (dot areas) D.

The number of the liquid droplets on the block is the number of the liquid droplets to be ejected onto the block virtually defined on the sheet P. Thus, the number of the liquid droplets on a certain block is equal to the number of dots of the ink ejection data corresponding to the certain block. In the present embodiment, the number of the liquid droplets on the certain block is obtained by counting the number of the dots on the block for the ink ejection data corresponding to black, cyan, magenta, and yellow, and then summing the numbers of the dots on the block for the respective four colors. For example, assuming that the thirty-six unit areas shown in FIGS. 3A-3D are the certain block, the number of the liquid droplets on this block is twenty-six (=six black droplets+three cyan droplets+six magenta droplets+eleven yellow droplets).

The amount of the liquid on the block is a total amount of the liquid droplet(s) of the ink to be ejected onto the block virtually defined on the sheet P. Thus, the amount of the liquid of a certain block is obtained by multiplying the number of the dots for each dot size for each color by the amount of the liquid droplet having the dot size and then summing the numbers obtained by this multiplication. For example, assuming that the thirty-six unit areas shown in FIGS. 3A-3D are the certain block, the number of the dots corresponding to the small droplets on this block is ten, the number of the dots corresponding to the medium-size droplets is twelve, and the number of the dots corresponding to the large droplets is four. Assuming that the amount of the small liquid droplet is 7 pl, the amount of the medium-size liquid droplet is 14 pl, and the amount of the large liquid droplet is 21 pl, the amount of the liquid on this block is 322 pl (=10×7 pl+12×14 pl+4×21 pl).

Figure 6A:
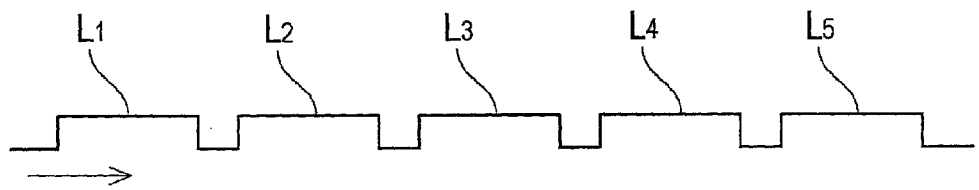
FIGS. 6A and 6B are views for explaining an example of a method for counting the number of liquid droplets and an amount of liquid on the block.
Figure 6B:
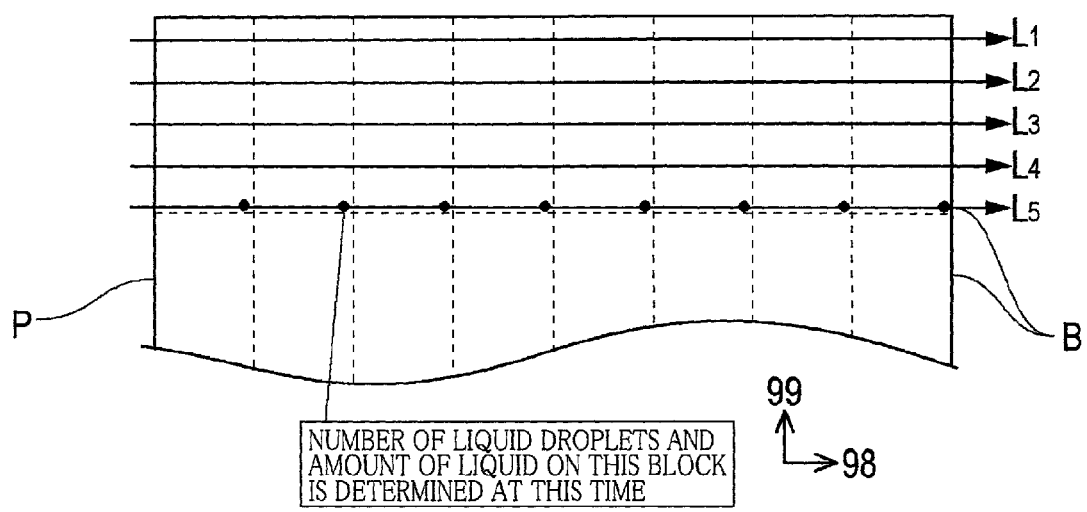

There will be explained a method for counting the number of the liquid droplets and the amount of the liquid on the block with reference to FIGS. 6A and 6B. As shown in FIG. 6A, the ink ejection data corresponding to one page is usually transmitted as line data respectively corresponding to lines of the one page. FIG. 6A shows line data L1-L5 respectively corresponds to first five lines of one page and are transmitted from the ink-ejection-data producing section 53 to the ink-ejection-data storage section 54. The line data corresponding to a single line expands over a plurality of the blocks. The line data L1-L5 are transmitted one by one, and at a point in time when all the ink ejection data corresponding to a certain block has been received, the number of the liquid droplets and the amount of the liquid on the certain block are determined. For example, FIG. 6B shows a manner in which, where ink ejection data corresponding to first-line blocks are contained in the line data L1-L5, the numbers of the liquid droplets and the amounts of the liquid on the first-line blocks (eight blocks) are determined when the line data L5 has been received by the ink-ejection-data storage section 54. As thus described, when all the ink ejection data corresponding to the certain block has been transmitted, the number of the liquid droplets and the amount of the liquid on this block are determined (S3: YES). Then in S4, the determined number of the liquid droplets and the determined amount of the liquid on the block are stored with an address of the block. Since the numbers of the liquid droplets and the amounts of the liquid on the blocks are counted, when the ink ejection data corresponding to one page has been received by the ink-ejection-data storage section 54, all the numbers of the liquid droplets and all the amounts of the liquid on the blocks for one page are determined. In this printer 101, the transmission of the data and the count of the number of the liquid droplets and the amount of the liquid are performed at the same time, making it possible to shorten a time required for the processings.

Figure 7:
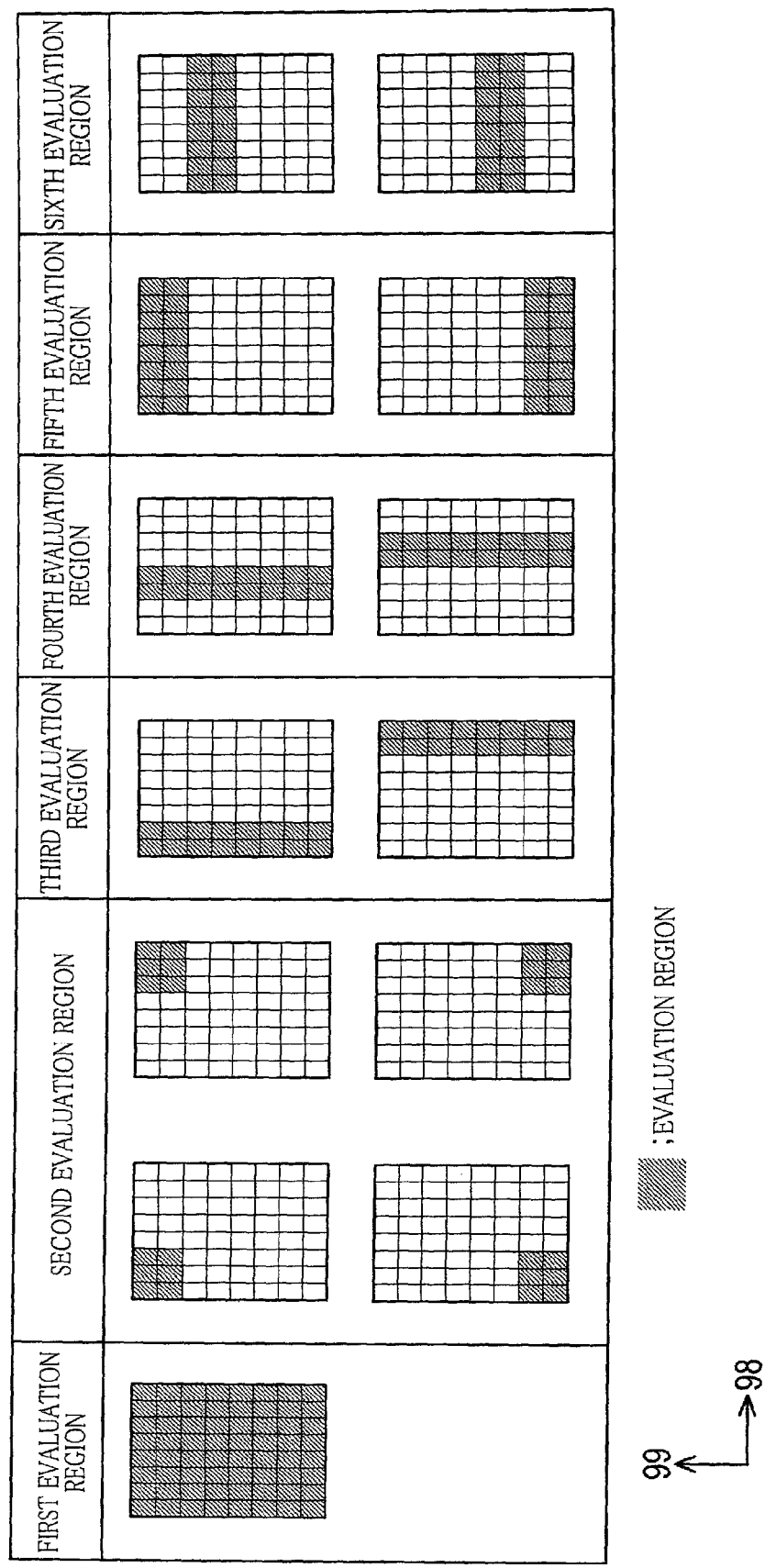
FIG. 7 is a view showing a relationship between evaluation regions and the blocks defined on the sheet.

The evaluation-region-specific counting section 62 uses the stored numbers of the liquid droplets and the stored amounts of the liquid on the blocks to calculate the number of the liquid droplets and an amount of the liquid on each evaluation region which will be described below. FIG. 7 is a view showing a relationship between the evaluation regions and the blocks defined on the sheet P. Here, each evaluation region is a hatched area in FIG. 7 into which one sheet P (one page) and the ink ejection data corresponding thereto are divided such that the evaluation region has an area larger than that of each block. The number of the liquid droplets on the evaluation region is a total number of the number of liquid droplets on at least one block contained in the evaluation region, and the amount of the liquid on the evaluation region is a total amount of the liquid on the at least one block contained in the evaluation region. The number of the liquid droplets and the amount of the liquid on the evaluation region are used for estimating or predicting a curl amount or degree.

FIG. 7 shows first to sixth evaluation regions. The first evaluation region shown in a first row of a table in FIG. 7 is constituted by all the blocks on the sheet P. The four second evaluation regions shown in a second row of the table in FIG. 7 are respectively located on four corners of the sheet P. Each of the second evaluation regions is constituted by six blocks in two lines and three rows which are located on a corresponding one of the four corners of the sheet P. The two third evaluation regions shown in a third row of the table in FIG. 7 are areas extending in the conveyance direction 99 at respective opposite end portions of the one sheet P in the recording widthwise direction 98. Each of the third evaluation regions is constituted by blocks contained in two rows (i.e., a one-fourth portion) of the sheet P at a corresponding one of the opposite end portions thereof in the recording widthwise direction 98. The two fourth evaluation regions shown in a fourth row of the table in FIG. 7 are areas extending in the conveyance direction 99 at a central portion of the sheet P in the recording widthwise direction 98. Each of the fourth evaluation regions is constituted by blocks contained in two rows (i.e., a one-fourth portion) of the sheet P which are located on one or the other side of a center line of the sheet P in the recording widthwise direction 98. The two fifth evaluation regions shown in a fifth row of the table in FIG. 7 are areas extending in the recording widthwise direction 98 at respective opposite end portions of the sheet P in the conveyance direction 99. Each of the fifth evaluation regions is constituted by blocks contained in two lines (i.e., a one-fourth portion) of the sheet P which are located on a corresponding one of the opposite end portions thereof in the conveyance direction 99. The two sixth evaluation regions shown in a sixth row of the table in FIG. 7 are areas extending in the recording widthwise direction 98 at a central portion of the sheet P in the conveyance direction 99. Each of the sixth evaluation regions is constituted by blocks contained in two lines (i.e., a one-fourth portion) of the sheet P which are located on one or the other side of a center line of the sheet P in the conveyance direction 99.

The evaluation-region-specific counting section 62 includes resisters individually for the thirteen first-sixth evaluation regions. The register of each evaluation region is equipped with an arithmetic circuit. When each arithmetic circuit has determined the number of the liquid droplets and an amount of the liquid on one or more blocks of a corresponding one of the evaluation regions (S11: YES), the number of the liquid droplets and the amount of the liquid on the evaluation region are calculated in S12. Then in S13, the calculated number of the liquid droplets and the calculated amount of the liquid on the evaluation region are stored in the register. Such a count (calculation) of the number of the liquid droplets and the amount of the liquid on each evaluation region by the evaluation-region-specific counting section 62 is performed in parallel with the count of the number of the liquid droplets and the amount of the liquid on each block by the block-specific counting section 61. That is, the number of liquid droplets and an amount of the liquid on a certain evaluation region are determined at a point in time when the number of the liquid droplets and the amount of the liquid on one or more blocks required for the count (calculation) of the number of the liquid droplets and the amount of the liquid on the certain evaluation region have been determined (that is, at a point in time when the number of the liquid droplets and the amount of the liquid on one or more blocks contained in the certain evaluation region have been determined). Thus, at a point in time when the transmission of the ink ejection data of one page is completed, the number of the liquid droplets and the amount of the liquid on all the evaluation region(s) in one page are determined. In this printer 101, the transmission of the ink ejection data and the count (calculation) of the number of the liquid droplets and the amount of the liquid are performed at the same time, making it possible to shorten a time required for the processings.

When the ink ejection data corresponding to one page has been received by the ink-ejection-data storage section 54 (S5:

YES), the curl-amount calculating section 63 in S6 obtains the calculated number of the liquid droplets and the calculated amount of the liquid on each evaluation region. Then in S7, the curl-amount calculating section 63 uses these obtained values to calculate the curl amount (degree) by which the sheet P is estimated or predicted to curl (hereinafter may be referred to as "estimated curl amount"). Here, the curl-amount calculating section 63 utilizes liquid-curl correlation information 67 stored in advance in the controller 100. The liquid-curl correlation information 67 is information representing a correlation of a curl amount of the sheet P with respect to the amount of the liquid and the number of the liquid droplets on the evaluation region. This liquid-curl correlation information 67 is a map or an expression experimentally or theoretically produced for each of positions of the respective evaluation regions, i.e., for each of the evaluation regions. In the present embodiment, for example, since the two third evaluation regions are symmetric in the recording widthwise direction 98, the same liquid-curl correlation information 67 can be used for the two third evaluation regions. Likewise, the same liquid-curl correlation information 67 can be used for each of the first-sixth evaluation regions. Thus, in the present embodiment, six sets of the liquid-curl correlation information 67 are stored in the controller 100.

Figure 8:
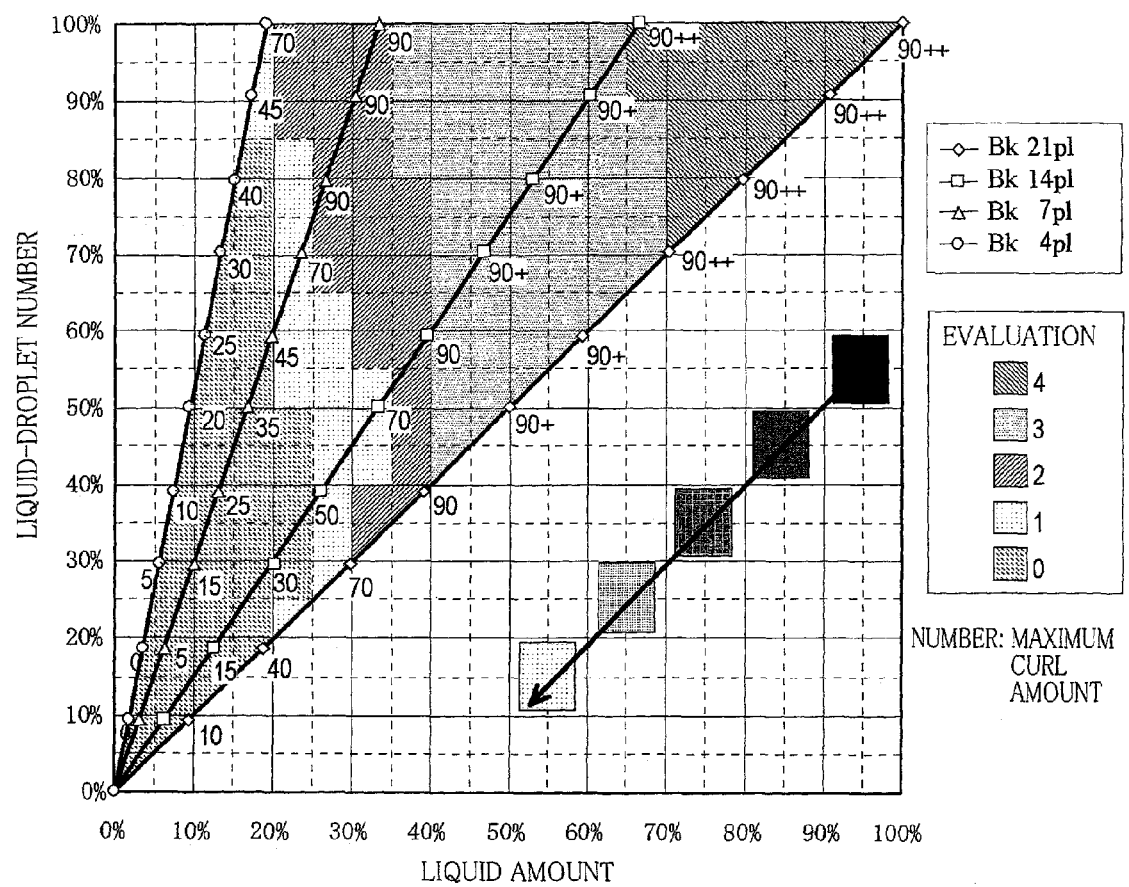
FIG. 8 is a view showing an example of a liquid-curl correlation information of a first evaluation region.

FIG. 8 is a view showing an example of the liquid-curl correlation information 67 for the first evaluation region. The liquid-curl correlation information 67 shown in FIG. 8 is a map representing a maximum curl amount (as one example of the curl amount) of the sheet P that is associated with the amount of the liquid and the number of the liquid droplets on the first evaluation region in FIG. 7. In this map, a vertical axis represents a ratio of the number of the liquid droplets on the evaluation region. The ratio of the number of the liquid droplets on the evaluation region (%) is set such that the total number of the dots on the evaluation region is 100%. Specifically, in the example shown in FIG. 8, the unit areas are the areas defined on the face of the sheet P in the grid pattern such that each unit area has the length of 1/600 inch in the recording widthwise direction 98 and in the conveyance direction 99 (that is, such that this printer 101 has the resolution of 600 dpi), and the number of the liquid droplets when the liquid droplets are respectively ejected on all the unit areas on the entire A4 sheet is set at 100%. Further, in the above-described map, a horizontal axis represents a ratio of the amount of the liquid on the evaluation region. The ratio of the amount of the liquid on the evaluation region (%) is set such that an amount of the liquid when one-color liquid droplets of a maximum size are ejected on all the unit areas of the evaluation region is 100%. In the example shown in FIG. 8, the unit areas are the areas defined on the face of the sheet P in the grid pattern such that each unit area has the length of 1/600 inch in the recording widthwise direction 98 and in the conveyance direction 99 (that is, such that this printer 101 has the resolution of 600 dpi), and an amount of liquid droplets when liquid droplets of the black ink each having an amount of 21 pl are respectively ejected on all the unit areas on the entire A4 sheet is set at 100%. Each of values at coordinates defined by the vertical axis and the horizontal axis represents the maximum curl amount of the sheet P.

Figure 9:
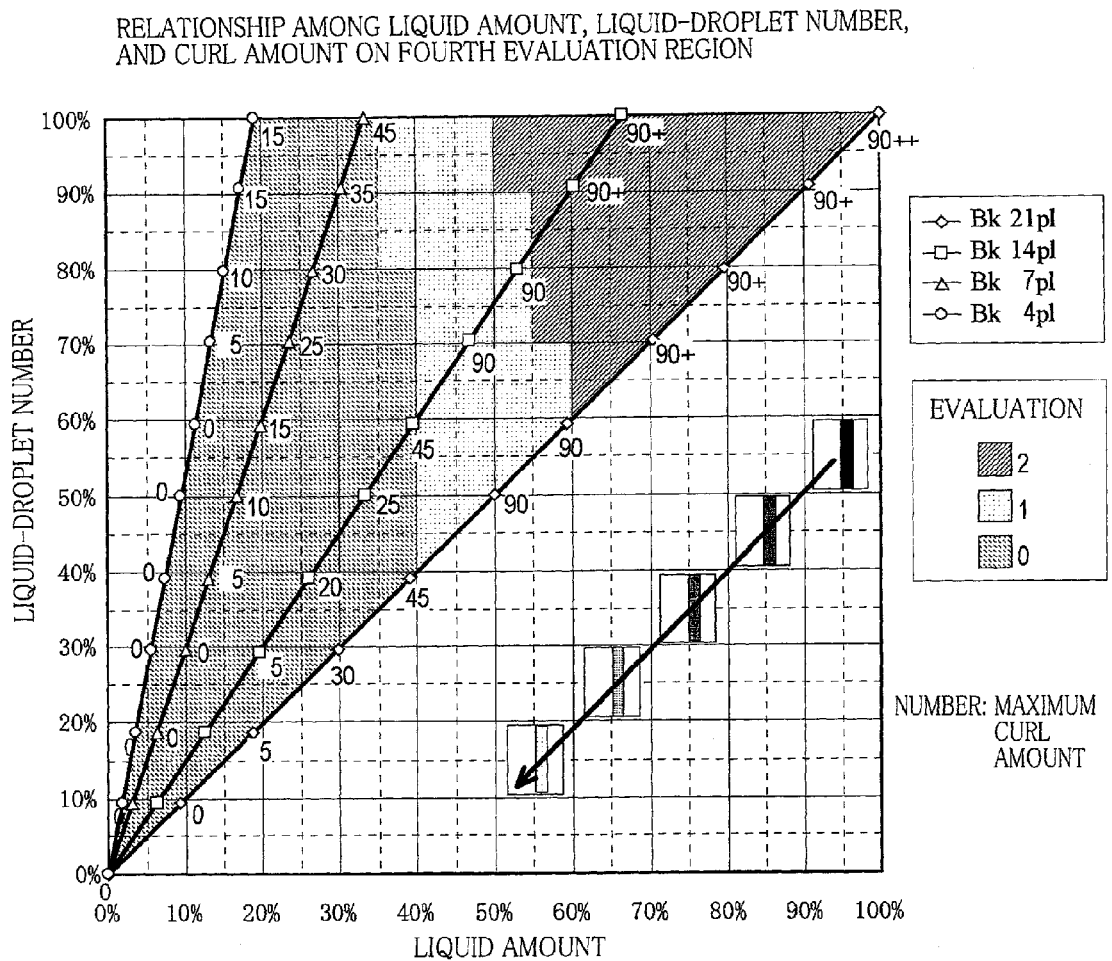
FIG. 9 is a view showing an example of a liquid-curl correlation information of a fourth evaluation region.

FIG. 9 is a view showing an example of the liquid-curl correlation information 67 for the fourth evaluation region. The liquid-curl correlation information 67 shown in FIG. 9 is a map representing a maximum curl amount (as one example of the curl amount) of the sheet P that is associated with the amount of the liquid and the number of the liquid droplets on the fourth evaluation region in FIG. 7. This map is generally the same as the map of the liquid-curl correlation information 67 for the first evaluation region. However, in the example shown in FIG. 9, in a vertical axis, the unit areas are the areas defined on the face of the sheet P in the grid pattern such that each unit area has the length of 1/600 inch in the recording widthwise direction 98 and in the conveyance direction 99 (that is, such that this printer 101 has the resolution of 600 dpi), and the number of the liquid droplets when the liquid droplets are respectively ejected on all the unit areas on a one-fourth portion of an A4 sheet at a central portion thereof in its widthwise direction is set at 100%. Further, in a horizontal axis, the unit areas are the areas defined on the face of the sheet P in the grid pattern such that each unit area has the length of 1/600 inch in the recording widthwise direction 98 and in the conveyance direction 99 (that is, such that this printer 101 has the resolution of 600 dpi), and an amount of the liquid droplets when the liquid droplets of the black ink each having the amount of 21 pl are respectively ejected on all the unit areas on the one-fourth portion of the A4 sheet at the central portion thereof in its widthwise direction is set at 100%. When comparing the liquid-curl correlation information 67 shown in FIG. 8 and the information 67 shown in FIG. 9 with each other, it is clear that even where the ratios of the numbers of the liquid droplets are the same as each other, and the ratios of the amounts of the liquid are the same as each other, the estimated curl amounts are different from each other depending on a position or a pattern of the evaluation region. Further, effects on the estimated curl amount are also different from each other depending on the position or the pattern of the evaluation region.

As described above, the curl-amount calculating section 63 uses the number of the liquid droplets and the amount of the liquid on the evaluation region calculated by the evaluation-region-specific counting section 62 to calculate the estimated curl amount for each evaluation region. In the present embodiment, the curl-amount calculating section 63 calculates the estimated curl amount for each of the thirteen evaluation regions in FIG. 7. Obtained thirteen curl amounts may be different from one another. In this case, the curl-amount calculating section 63 compares these curl amounts with one another and determines a largest one of the curl amounts as the estimated curl amount of the sheet P.

The curl suppressing section 64 then executes a processing for suppressing an occurrence of the curl of the sheet P on the basis of the estimated curl amount. Specifically, in S8, the curl suppressing section 64 compares the estimated curl amount with a predetermined threshold to judge whether the processing for suppressing the curl is required or not, that is, whether any change of the ink ejection data is required or not. Where the estimated curl amount is equal to or less than the threshold, the curl suppressing section 64 judges that the change of the ink ejection data is not required (S8: NO) and in S10 allows the recording based on the ink ejection data. On the other hand, where the estimated curl amount is greater than the threshold, the curl suppressing section 64 judges that the change of the ink ejection data is required (S8: YES) and in S9 executes a processing (which will be described below) for changing the ink ejection data in order to suppress the curl of the sheet P. Here, the change to be made to the ink ejection data is a change of at least one of a liquid amount of the ink and the number of liquid droplets to be ejected onto at least an evaluation region(s) having an effect on the estimated curl amount. In order for this change, the ink ejection data may be changed entirely or locally. The ink ejection data is changed such that the liquid amount of the ink to be ejected onto the evaluation region(s) having the effect on the estimated curl amount is reduced by reducing at least one of the number of the liquid droplets and the size of the liquid droplet(s) (i.e., the amount of the liquid droplet(s)) to be ejected onto the evaluation region(s). Alternatively, the ink ejection data is changed such that the number of the liquid droplets to be ejected onto the evaluation region(s) having the effect on the estimated curl amount is reduced and such that the size of the liquid droplet(s) to be ejected onto the evaluation region(s) is increased. In either case, the ink ejection data is changed such that the estimated curl amount based on the changed ink ejection data does not exceed the threshold.

In order to change the ink ejection data, the curl suppressing section 64 outputs a command for producing data again to the ink-ejection-data producing section 53. The command for producing the data again includes various commands and data such as a command for producing again the ink ejection data that does not cause the curl, and a curl amount calculated for each evaluation region. When having received the command for producing the data again, the ink-ejection-data producing section 53 produces the ink ejection data such that an estimated curl amount to be obtained based on the newly produced ink ejection data is equal to or less than the threshold. Specifically, the ink-ejection-data producing section 53 produces the ink ejection data on the basis of the image data stored in the image-data storage section 52 and then corrects the ink ejection data by the gamma correction processing and the error diffusion processing so as to reduce the number of dots per unit size (area) and increase a size of each dot. In the production of the ink ejection data again, an inclination of a gamma curve is suppressed by the gamma correction processing to pale a color of each dot, and the threshold is changed by the error diffusion processing (for example, the threshold is changed such that no small droplets are to be ejected). The ink ejection data thus produced is transmitted to the ink-ejection-data storage section 54. Also in this transmission, as described above, the block-specific counting section 61 and the evaluation-region-specific counting section 62 count or obtain the number of the liquid droplets and the amount of the liquid, then the curl-amount calculating section 63 calculates the estimated curl amount based on the newly produced ink ejection data, and then the curl suppressing section 64 executes the judgment for the estimated curl amount based on the newly produced ink ejection data. In this printer 101, since the correction is made so as to increase the size of each dot by reducing the number of dots per unit size (area), it is possible to suppress the curl while preventing a density of the image from lowering.

The controller 100 includes a treatment-liquid ejection-data producing section 56, a treatment-liquid ejection-data storage section 57, the head controlling section 51 as one example of a liquid-droplet-ejection-head controlling section, and the image-data storage section 52.

Where the recording based on the ink ejection data is allowed by the curl suppressing section 64, the treatment-liquid ejection-data producing section 56 produces treatment-liquid ejection data on the basis of the ink ejection data stored in the ink-ejection-data storage section 54. The treatment-liquid ejection-data storage section 57 stores therein the produced treatment-liquid ejection data. The treatment-liquid ejection data is data representing a dot size of the treatment liquid to be formed on the unit areas (dot areas) virtually defined on the sheet P. The dot size in the treatment-liquid ejection data is represented by one of four levels or sizes, namely, zero, a small droplet, a medium-size droplet, and a large droplet of the treatment liquid to be ejected onto the unit area(s) on the sheet P by the treatment-liquid head 1b.

Figure 10:
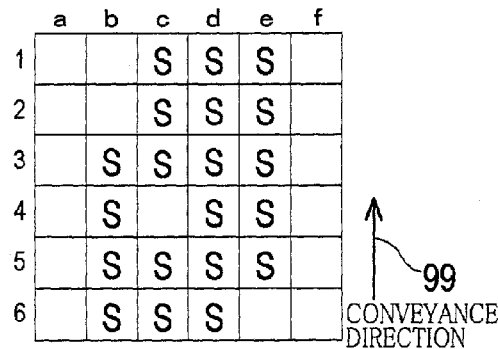
FIG. 10 is a view showing treatment-liquid ejection data of the certain area which corresponds to the ink ejection data in FIGS. 3A-3D.

FIG. 10 shows treatment-liquid ejection data produced on the basis of the ink ejection data shown in FIGS. 3A-3D. It is noted that "S" in FIG. 10 represents a size of a dot to be formed on the unit area virtually defined on the sheet P, and each unit area having no symbol represents a unit area on which the dot is not to be formed. It is noted that the size S as the dot size of the treatment-liquid ejection data corresponds to the small droplet to be ejected from the treatment-liquid head 1b. The treatment-liquid ejection data is produced such that the dot of the size S is selectively formed on the unit area(s) on the basis of the ink ejection data. Thus, the treatment-liquid head 1b ejects the small droplet of the treatment liquid onto each unit area onto which the ink is to be ejected on the basis of the treatment-liquid ejection data such that positions of the ink to be landed on the sheet P and an area on which the treatment liquid is to be applied coincide with each other.

The conveyance controlling section 59 controls the sheet-supply unit 103, the conveyance roller pairs 13, the conveyance roller pairs 8, the sheet-discharge roller pairs 28, the registration roller pair 4, and the conveyance unit 16 such that the sheet P is conveyed through the conveyance path 5. Specifically, the conveyance controlling section 59 controls: the sheet-supply motor 31 for driving the sheet-supply roller 12 of the sheet-supply unit 103; a conveyance motor 32 for driving the conveyance roller pairs 13 and the registration roller pair 4; a sheet-discharge motor 34 for driving the sheet-discharge roller pairs 28; and the conveyance motor 33 for driving the conveyance roller pairs 8 of the conveyance unit 16.

The head controlling section 51 includes: a recording-head controlling section 51a configured to control the actuators of the recording heads 1a; and a treatment-liquid-head controlling section 51b configured to control the actuators of the treatment-liquid head 1b. The recording-head controlling section 51a controls the recording heads 1a via a head driving circuit 30 to eject the ink onto the conveyed sheet P on the basis of the ink ejection data stored in the ink-ejection-data storage section 54. The treatment-liquid-head controlling section 51b controls the treatment-liquid head 1b via the head driving circuit 30 to eject the treatment liquid onto the sheet P on the basis of the treatment-liquid ejection data stored in the treatment-liquid ejection-data storage section 57, such that the position(s) of the ink to be landed on the sheet P coincides with the position(s) of the treatment liquid to be landed on the sheet P. In the present embodiment, as described above, the size or amount of each of the ink or the treatment liquid to be ejected from the heads 1 can be changed among the four levels or sizes, namely, zero, the small droplet, the medium-size droplet, and the large droplet.

On the basis of the ink ejection data and the treatment-liquid ejection data produced as described above, the head controlling section 51 controls the head unit 10, and the conveyance controlling section 59 controls the conveyance unit 16 and the sheet-supply unit 103. As a result of these controls, the treatment liquid is ejected from the treatment-liquid head 1b onto the sheet P conveyed through the conveyance path 5, and then the ink is ejected from the recording heads 1a to form the image on the sheet P. Here, since the ink ejection data is processed so as to suppress the curl of the sheet P, no or an extremely small amount of curl is produced on the sheet P on which the ink has been landed.

As described above, in the printer 101 to which the present invention is applied, the number of the liquid droplets and the amount of the liquid to be ejected onto the evaluation region defined on the sheet P are calculated on the basis of the ink ejection data corresponding to the evaluation region, and the amount or degree by which the sheet P is estimated to curl is calculated on the basis of the number of the liquid droplets and the amount of the liquid. Since the number of the liquid droplets and the amount of the liquid are used to calculate the estimated curl amount, it is possible to calculate the estimated curl amount more accurately.

Further, to obtain the estimated curl amount of the sheet P, the curl amounts of the sheet P are calculated for the plurality of evaluation regions, and the largest one of the obtained curl amounts is determined as the estimated curl amount of the sheet P. As a result, even in the case where the curl is produced on the sheet P locally, it is possible to estimate the curl amount to be produced on the sheet P more accurately.

Further, to obtain the estimated curl amount of the sheet P, the plurality patterns of the evaluation regions are set, and the curl amounts of the sheet P are calculated for the plurality of evaluation regions, and the largest one of the obtained curl amounts is determined as the estimated curl amount of the sheet P. Thus, it is possible to estimate the curl amount to be produced on the sheet P more reliably.

Further, the processing for suppressing the curl is executed on the basis of the curl amount of the sheet P estimated accurately as described above, making it possible to suppress the curl efficiently. Here, since the ink ejection data is changed for suppressing the curl, it is possible to suppress lowering of a throughput of the recording when compared with the cases where the sheet P is stopped or held for a specific length of time in a state in which the sheet P is straightened and where a conveyance speed of the sheet P is lowered in order to dry the liquid attached to the sheet P.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

For example, in the above-described embodiment, the six patterns of the thirteen evaluation regions are set on the sheet P, but the patterns and the number of the evaluation regions are not limited to those in the above-described embodiment. Further, sixty-four blocks are defined on the one sheet in the above-described embodiment, but the one sheet may be divided into larger or smaller blocks. Alternatively, a concept of the blocks may be omitted (that is, the calculation of the number of the liquid droplets and the amount of the liquid on each block may be omitted) to directly calculate the number of the liquid droplets and the amount of the liquid on each evaluation region. Further, in order to speed up computations, the number of the liquid droplets and the amount of the liquid on the evaluation region, and the curl amount of the sheet P may be calculated for only a plurality of evaluation regions having a relatively great effect on the speed of the computations.

Further, for example, in the above-described embodiment, where the inks of different colors are ejected on the same unit area, the number of the liquid droplets on the unit area is calculated and determined as one for each color ink. Instead of this configuration, where the inks of different colors are ejected on the same unit area, the number of the liquid droplets on the unit area may be calculated and determined as one in total. In this case, the number of the liquid droplets is twenty on the block in FIGS. 3A-3D. In this calculation of the number of the liquid droplets, the curl amount is calculated on the basis of (i) the size of the liquid droplet on the evaluation region and (ii) an area (size) of a region(s) on which the liquid droplet(s) has or have been attached on the evaluation region. Since the curl amount is affected by an area (size) of a region(s) on the sheet on which the liquid droplet(s) has or have been attached (especially an area of continuous liquid-attached regions) or by a ratio of the liquid-attached regions to the entire sheet, it is advantageous to calculate the number of the liquid droplets in such a manner.

Further, for example, in the above-described embodiment, the block-specific counting section 61 and the evaluation-region-specific counting section 62 calculate the amount of the liquid and the number of the liquid droplets on each block or each evaluation region on the basis of the ink ejection data but may be configured to calculate the amount of the liquid and the number of the liquid droplets on each block or each evaluation region on the basis of the image data. In other words, the amount of the liquid and the number of the liquid droplets on each evaluation region may be calculated on the basis of data for image recording on the sheet P such as the ink ejection data and the image data.

Figure 11:
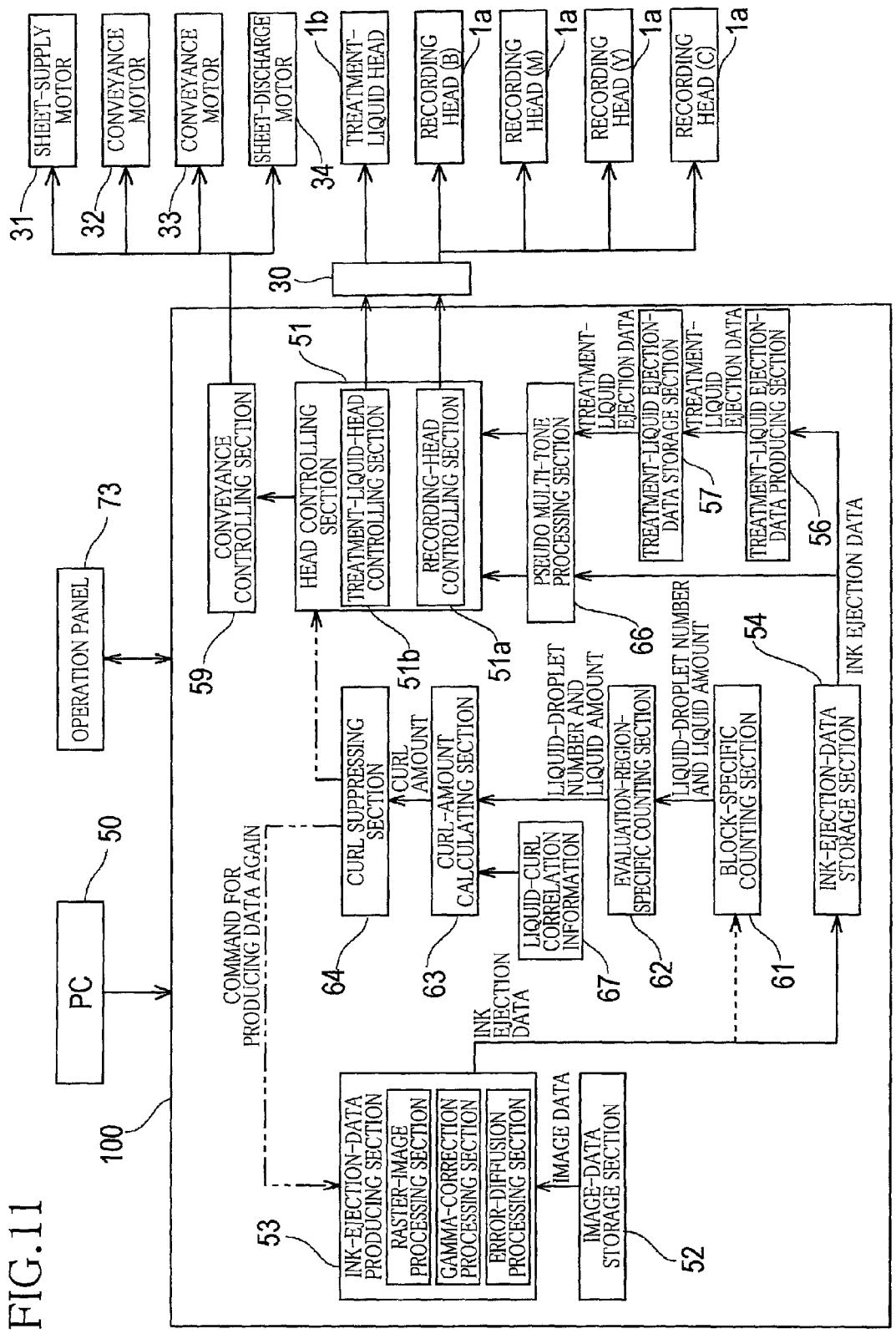
FIG. 11 is a functional block diagram of a controller of a modification.

In the above-described embodiment, the curl suppressing section 64 produces the ink ejection data again for suppressing the curl, but in this case, the throughput of the recording may slightly lower due to a time required for producing the ink ejection data again. In order to solve this problem, instead of producing the ink ejection data again for suppressing the curl, the recording-head controlling section 51a may control the recording heads 1a to eject the liquid such that an amount of the liquid to be ejected and the number of the liquid droplets to be ejected are less than the amount of the liquid and the number of the liquid droplets contained in the ink ejection data. In this case, as shown in FIG. 11, the controller 100 includes a pseudo multi-tone processing section 66.

Specifically, where the curl suppressing section 64 has judged that the change of the ink ejection data is required, the pseudo multi-tone processing section 66 executes a pseudo multi-tone processing for locally restraining or decreasing a total amount of the ink and the number of the liquid droplets, when the ink ejection data is transmitted from the ink-ejection-data storage section 54 to the recording-head controlling section 51a. As a result, the recording-head controlling section 51a controls the recording heads 1a to eject the ink on the basis of the ink ejection data changed or modified for suppressing the curl of the sheet P. The pseudo multi-tone processing section 66 includes: a computing section configured to execute the pseudo multi-tone processing; and a line buffer for temporarily storing one or more sets of line data required for the processing. In order to limit the total amount of the ink and the number of the liquid droplets, the pseudo multi-tone processing section 66 transmits the ink ejection data to the recording-head controlling section 51a while processing or modifying the ink ejection data by adding a mask pattern(s) each having a certain-size area (e.g., a block constituted by 8×8 dots) that is larger than the unit area. Each mask pattern can make the certain-size area pseudo multi-tones (gray levels or gradation levels) by setting, as unit, the certain-size area larger than the unit area, to decrease the total amount of the ink and the number of the liquid droplets on the certain-size area, for example. This mask pattern may be applied not to whole one page but locally to only the certain-size area(s) on the one page, each of which has an effect on the estimated curl amount. A plurality of the mask patterns are preferably stored in advance in the controller 100 to use the most suitable one of the mask patterns depending on the curl amount calculated for each evaluation region. Alternatively, a spatial filter may be used instead of the above-described mask pattern. In the mask pattern, the ink ejection data is processed such that the number of the liquid droplets or the size of the liquid droplet on a predetermined one or more unit areas on the certain-size area is decreased independently of the original number of the liquid droplets or the original size of the liquid droplet, but in the spatial filter, the number of the liquid droplets or the size of the liquid droplet on a certain unit area is decreased on the basis of the number of the liquid droplets and the size of the liquid droplet on the certain unit area and unit areas therearound. For example, the spatial filter can zero the number of the liquid droplets on the unit area surrounded with unit areas onto which the ink is ejected, and increase the size of the liquid droplets to be ejected onto the surrounding unit areas. Further, as another example, the spatial filter can decrease a density of an area on one page which has a great effect on the estimated curl amount, to decrease the number of the liquid droplets or the size of the liquid droplet(s) on the area. In the configuration in which the pseudo multi-tone processing is performed for the ink ejection data transmitted from the ink-ejection-data storage section 54 to the recording-head controlling section 51a for suppressing the curl, the ink ejection data has been processed at a point in time when the transmission of the ink ejection data is completed, making it possible to perform the recording with the suppression of the curl without lowering the throughput (i.e., a processing ability per unit time).

It is noted that, the present invention is applicable to a liquid-droplet ejecting apparatus configured to eject liquid other than the ink. Further, the present invention is applicable not only to the printer but also to other liquid-droplet ejecting apparatuses such as a facsimile machine and a copying machine. Further, in the above-described embodiment, the head controlling section 51 drives the actuators (e.g., piezoelectric actuators) of the treatment-liquid head 1b and the actuators of the recording heads 1a, but the configuration for driving the heads 1 is not limited to this configuration. For example, each of the treatment-liquid head 1b and the recording heads 1a may include a heating element to eject the treatment liquid or the ink by driving this heating element.

What is claimed is:

1. A liquid-droplet ejecting apparatus comprising:
at least one liquid-droplet ejection head configured to eject a plurality of liquid droplets, each being one of a plurality of sizes, onto a recording medium, the plurality of sizes respectively corresponding to a plurality of predetermined amounts of liquid that are different from each other;
a liquid-droplet-ejection-data storage section configured to store liquid-droplet ejection data which causes the at least one liquid-droplet ejection head to eject the plurality of liquid droplets each having one size selected from among the plurality of sizes according to an image formed on the recording medium;
a liquid-droplet-ejection-head controlling section configured to control the at least one liquid-droplet ejection head on the basis of the liquid-droplet ejection data;
a liquid-droplet-count obtaining section configured to obtain the number of liquid droplets to be ejected for each of a plurality of evaluation regions that are defined on the recording medium and locations of which on the recording medium are different from each other, the liquid-droplet-count obtaining section being configured to obtain the number of the liquid droplets on the basis of evaluation ejection data corresponding to the plurality of evaluation regions among the liquid-droplet ejection data;
a liquid-amount obtaining section configured to obtain an amount of the liquid to be ejected for each of the plurality of evaluation regions, the liquid-amount obtaining section being configured to obtain the amount of the liquid on the basis of the evaluation ejection data;
a curl-amount obtaining section configured to obtain an amount of a curl of the recording medium on the basis of liquid-curl correlation information, the obtained amount of the liquid for each of the plurality of evaluation regions, and the obtained number of the liquid droplets for each of the plurality of evaluation regions, the liquid-curl correlation information representing a plurality of correlations between the amount of curl, the obtained amount of the liquid, and the obtained number of the liquid droplets for the respective plurality of evaluation regions, the plurality of correlations for the respective plurality of evaluation regions being different from each other;
a curl suppressing section configured to change the evaluation ejection data on the basis of the amount of the curl of the recording medium obtained by the curl-amount obtaining section when a processing for suppressing the curl of the recording medium is required, the curl suppressing section being configured to change the evaluation ejection data so as to change at least one of the amount of the liquid and the number of the liquid droplets to be ejected onto at least one of the plurality of evaluation regions on the recording medium to suppress the curl of the recording medium; and
a correlation-information storage section configured to store the liquid-curl correlation information comprising a first liquid-curl correlation value and a second liquid-curl correlation corresponding to the amount of curl based on a number of liquid droplets to be ejected for a certain evaluation region of the plurality of evaluation regions in a case when the total amount of ejected liquid in the certain evaluation region is equal,
wherein the first liquid-curl correlation value corresponds to a first curl amount that occurs when a first number of the liquid droplets is ejected for the certain evaluation region and the second liquid-curl correlation value corresponds to a second curl amount that occurs when a second number of the liquid droplets is ejected for the certain evaluation region,
wherein the first number of the liquid droplets is less than the second number of the liquid droplets, and
wherein the first curl amount is less than the second curl amount.

2. The liquid-droplet ejecting apparatus according to claim 1, wherein, where the amount of the curl obtained by the curl-amount obtaining section is greater than a predetermined threshold, the curl suppressing section judges that the processing for suppressing the curl of the recording medium is required.

3. The liquid-droplet ejecting apparatus according to claim 1, wherein the curl suppressing section is configured to change the evaluation ejection data so as to reduce the amount of the liquid to be ejected onto at least one of the plurality of evaluation regions by reducing at least one of the number of the liquid droplets and a size of the liquid droplet to be ejected onto the at least one of the plurality of evaluation regions on the recording medium.

4. The liquid-droplet ejecting apparatus according to claim 1, wherein the curl suppressing section is configured to change the evaluation ejection data such that the number of the liquid droplets to be ejected onto at least one of the plurality of evaluation regions on the recording medium is reduced and such that a size of the liquid droplet to be ejected onto at least one unit area included in the one of the plurality of evaluation regions is increased.

5. The liquid-droplet ejecting apparatus according to claim 4, wherein each of the at least one unit area is an area defined by a resolution of the image to be formed on the recording medium, such that one liquid droplet is ejected onto each of the at least one unit area.

6. The liquid-droplet ejecting apparatus according to claim 1, further comprising a liquid-droplet-ejection-data producing section configured to produce the liquid-droplet ejection data on the basis of image data based on which the image is formed on the recording medium, wherein the liquid-droplet-count obtaining section is configured to obtain the number of the liquid droplets at a point in time when the liquid-droplet ejection data produced by the liquid-droplet-ejection-data producing section is transmitted to the liquid-droplet-ejection-data storage section.

7. The liquid-droplet ejecting apparatus according to claim 6, wherein each of the plurality of evaluation regions is constituted by at least one of a plurality of blocks defined by dividing, into a plurality of areas, an area on the recording medium on which the image is to be recorded, and wherein the liquid-droplet-count obtaining section is configured to obtain the number of liquid droplets to be ejected onto the at least one of the plurality of blocks, at a point in time when all liquid-droplet ejection data corresponding to the at least one of the plurality of blocks among the liquid-droplet ejection data produced by the liquid-droplet-ejection-data producing section has been transmitted.

8. The liquid-droplet ejecting apparatus according to claim 7, wherein the liquid-droplet-count obtaining section is configured to obtain the number of the liquid droplets to be ejected onto each of the plurality of evaluation regions, at a point in time when the liquid-droplet-count obtaining section has obtained the number of liquid droplets to be ejected onto all the plurality of blocks constituting each of the plurality of evaluation regions.

9. The liquid-droplet ejecting apparatus according to claim 6, wherein the curl suppressing section is configured to control the liquid-droplet-ejection-data producing section to produce the liquid-droplet ejection data again such that at least one of the amount of the liquid and the number of the liquid droplets to be ejected onto at least one of the plurality of evaluation regions on the recording medium is changed.

10. The liquid-droplet ejecting apparatus according to claim 1, further comprising a pseudo multi-tone processing section configured to execute a pseudo multi-tone processing for the liquid-droplet ejection data so as to change at least one of the amount of the liquid and the number of the liquid droplets to be ejected onto at least one of the plurality of evaluation regions on the recording medium, wherein the curl suppressing section is configured to control the pseudo multi-tone processing section to execute the pseudo multi-tone processing for the liquid-droplet ejection data when the liquid-droplet ejection data is transmitted from the liquid-droplet-ejection-data storage section to the liquid-droplet-ejection-head controlling section.

11. The liquid-droplet ejecting apparatus according to claim 1, wherein the curl-amount obtaining section is configured to obtain amounts of the curl of the recording medium respectively for each of the plurality of evaluation regions and determine a largest one of the amounts of the curl, and wherein the curl suppressing section is configured to change the evaluation ejection data on the basis of the determined largest one of the amounts of the curl.

12. The liquid-droplet ejecting apparatus according to claim 1, wherein the liquid-amount obtaining section is configured to obtain the amount of the liquid to be ejected for each of the plurality of evaluation regions on the basis of the number of liquid droplets obtained by the liquid-droplet-count obtaining section and each of the sizes of the liquid droplets.

* * * * *